United States Patent
Kludy et al.

(10) Patent No.: US 10,255,157 B2
(45) Date of Patent: Apr. 9, 2019

(54) TYPE SAFE SECURE LOGGING

(71) Applicant: Citrix Systems, Inc., Fort Lauderdale, FL (US)

(72) Inventors: Thomas M. Kludy, Cooper City, FL (US); Thomas Hammond, Coconut Creek, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 111 days.

(21) Appl. No.: 15/650,371

(22) Filed: Jul. 14, 2017

(65) Prior Publication Data
US 2019/0018750 A1   Jan. 17, 2019

(51) Int. Cl.
*G06F 11/34* (2006.01)
*G06F 21/62* (2013.01)
*G06F 11/36* (2006.01)

(52) U.S. Cl.
CPC ...... *G06F 11/3476* (2013.01); *G06F 11/3624* (2013.01); *G06F 11/3636* (2013.01); *G06F 21/6218* (2013.01)

(58) Field of Classification Search
CPC ............. G06F 11/3476; G06F 11/3624; G06F 11/3636; G06F 21/6218
See application file for complete search history.

(56) References Cited

U.S. PATENT DOCUMENTS

| | | | | |
|---|---|---|---|---|
| 7,703,144 B2* | 4/2010 | Polozoff | ............. | G06F 21/6209 713/160 |
| 7,818,729 B1* | 10/2010 | Plum | ................... | G06F 11/3624 717/140 |
| 8,671,455 B1* | 3/2014 | Zhu | ........................ | G06F 21/554 726/26 |
| 2003/0066052 A1* | 4/2003 | McGeorge, Jr. | ..... | G06F 11/3476 717/124 |
| 2003/0212899 A1* | 11/2003 | Curtis | ................. | G06F 21/6218 726/27 |

(Continued)

OTHER PUBLICATIONS

Interfaces in C++ (Abstract Classes), Tutorialspoint Simply Easy Learning, downloaded from https://www.tutorialspoint.com/cplusplus/cpp_interfaces.htm, printed on May 31, 2017, 3 pages.

*Primary Examiner* — Ziaul A Chowdhury
(74) *Attorney, Agent, or Firm* — Banner & Witcoff, Ltd.

(57) ABSTRACT

Aspects of the disclosure relate to providing type safe secure logging. A computing platform may receive application code comprising one or more calls to one or more logging methods. Subsequently, the computing platform may compile the application code comprising the one or more calls to the one or more logging methods to produce a compiled software application. During the compiling of the application code comprising the one or more calls to the one or more logging methods, the computing platform may enforce one or more type-based secure logging rules on the application code comprising the one or more calls to the one or more logging methods. Thereafter, the computing platform may store the compiled software application. In some embodiments, enforcing the one or more type-based secure logging rules may include allowing logging of one or more predetermined classes of objects.

20 Claims, 8 Drawing Sheets

(56) References Cited

U.S. PATENT DOCUMENTS

| | | | | |
|---|---|---|---|---|
| 2005/0027783 A1* | 2/2005 | Green | ............... | G06F 11/3476 709/200 |
| 2005/0223282 A1* | 10/2005 | Frey | ............... | G06F 11/3476 714/20 |
| 2005/0223367 A1* | 10/2005 | Smith | ............... | G06F 11/3624 717/128 |
| 2006/0075390 A1* | 4/2006 | McAllister | ............... | G06F 11/3636 717/128 |
| 2008/0010497 A1* | 1/2008 | Kronlund | ............... | G06F 11/0769 714/6.11 |
| 2015/0356293 A1* | 12/2015 | Biswas | ............... | G06F 21/31 726/22 |
| 2017/0024408 A1* | 1/2017 | Foley | ............... | H04L 63/1408 |
| 2018/0077142 A1* | 3/2018 | Thakkar | ............... | G06F 21/00 |

* cited by examiner

Developer Computing Device
*Code Review*

```
_log.Write(string.IsNullOrEmpty(result.ErrorMessage)
    ? LogEntry
      .Safe(
         context,
         "Authentication successful.")
      .Unsafe("alias", credentials.Username)
```

...continued below

| Back | Next |

FIG. 3

Developer Computing Device
*Code Review*

...continuing from above

```
    : LogEntry
       .Safe(
          context,
          "Authentication unsuccessful.")
       .Unsafe("alias", credentials.Username)
       .Unsafe("errorMessage", result.ErrorMessage));
```

| Back | Next |

TYPE SAFE SECURE LOGGING

TECHNICAL FIELD

Aspects of the disclosure relate to data processing and software development, installation, and management. In particular, one or more aspects of the disclosure relate to software program development tools that provide type safe secure logging features.

BACKGROUND

Software developers may use logging systems to capture data associated with the execution of a particular software application, as such data may be useful to developers for various purposes, including debugging and optimizing the application. In some instances, however, it may be difficult to prevent the logging of data that should not be logged, such as data that includes passwords or other secret information, particularly while also optimizing for the efficiency of the software code and for the performance of the one or more computer systems that may execute the code and/or provide the logging functions.

SUMMARY

Aspects of the disclosure provide effective, efficient, scalable, and convenient technical solutions that address and overcome the technical problems associated with logging data associated with the execution of software applications. In particular, one or more aspects of the disclosure provide software program development tools having type safe secure logging features.

As illustrated in greater detail below, aspects of the disclosure provide features that improve the operation of computer systems by providing more secure and more efficient ways in which one computer system may log data to another computer system. In addition, some of the features discussed in greater detail below provide these technical improvements at compile-time as program code is being compiled, rather than at run-time as a program is being executed, so as to prevent the inadvertent logging of secret information. For example, a cloud computing platform that provides virtualization and/or remote desktops to end-user computing devices may log data indicating when particular virtualized sessions and/or remote desktops are created, data indicating what devices are requesting and/or accessing such sessions and/or desktops, data indicating what methods are being entered and/or exited by the computing platform, and/or other data associated with the operation of the computing platform. By implementing one or more aspects of the disclosure, such a computing platform may be configured to securely and efficiently log such data to one or more remote data logging systems while preventing the logging of secret information.

In accordance with one or more embodiments, a computing platform having at least one processor, a memory, and a communication interface may receive application code comprising one or more calls to one or more logging methods. Subsequently, the computing platform may compile the application code comprising the one or more calls to the one or more logging methods to produce a compiled software application. During the compiling of the application code comprising the one or more calls to the one or more logging methods, the computing platform may enforce one or more type-based secure logging rules on the application code comprising the one or more calls to the one or more logging methods. Thereafter, the computing platform may store the compiled software application.

In some embodiments, prior to receiving the application code comprising the one or more calls to the one or more logging methods, the computing platform may receive one or more type-safe logging rules. Subsequently, the computing platform may generate a type-safe secure logging library based on the one or more type-safe logging rules, and the computing platform may store the type-safe secure logging library.

In some embodiments, generating the type-safe secure logging library based on the one or more type-safe logging rules may include defining one or more classes of objects as being safe for logging. In some embodiments, generating the type-safe secure logging library based on the one or more type-safe logging rules may include defining one or more interfaces for asserting that one or more specific objects are safe for logging. In some embodiments, generating the type-safe secure logging library based on the one or more type-safe logging rules may include defining one or more logging methods that only accept one or more safe types of objects for logging data with one or more logging systems. In some embodiments, the one or more logging methods defined in the type-safe secure logging library may cause the compiled software application to log data with at least one specific logging system when the compiled software application is executed.

In some embodiments, receiving the application code comprising the one or more calls to the one or more logging methods may include receiving, via the communication interface, the application code comprising the one or more calls to the one or more logging methods from a first developer computing device.

In some embodiments, prior to compiling of the application code comprising the one or more calls to the one or more logging methods, the computing platform may send, via the communication interface, to a second developer computing device, a code review notification.

In some embodiments, after sending the code review notification to the second developer computing device, the computing platform may receive, via the communication interface, from the second developer computing device, a code review request. Responsive to receiving the code review request, the computing platform may send, via the communication interface, to the second developer computing device, the application code comprising the one or more calls to the one or more logging methods. Subsequently, the computing platform may receive, via the communication interface, from the second developer computing device, code review results information. Responsive to receiving the code review results information, the computing platform may send, via the communication interface, to the first developer computing device, a code review status notification.

In some embodiments, prior to compiling of the application code comprising the one or more calls to the one or more logging methods, the computing platform may receive, via the communication interface, from the first developer computing device, a request to compile the application code comprising the one or more calls to the one or more logging methods.

In some embodiments, enforcing the one or more type-based secure logging rules on the application code comprising the one or more calls to the one or more logging methods may include allowing logging of one or more predetermined classes of objects.

In some embodiments, enforcing the one or more type-based secure logging rules on the application code comprising the one or more calls to the one or more logging methods may include detecting an attempt to log at least one unsafe type of object, and in response to detecting the attempt to log the at least one unsafe type of object, generating an error message.

In some embodiments, enforcing the one or more type-based secure logging rules on the application code comprising the one or more calls to the one or more logging methods may include allowing logging of one or more potentially unsafe types of objects based on the one or more potentially unsafe types of objects being wrapped in a safe-logging wrapper.

In some embodiments, the computing platform may send, via the communication interface, to a first developer computing device, the compiled software application. In some embodiments, the computing platform may push, via the communication interface, to one or more production servers, the compiled software application.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure provide software program development tools having type safe secure logging features. In one or more arrangements, a library of type-safe methods is provided that helps to ensure that developers do not make mistakes by logging security-sensitive information. For instance, some existing logging libraries may be exclusively string-based and might not provide a way to indicate to the library if a string is safe for logging or if the string potentially could contain sensitive information. As a result, incidents may arise in which improper information may be logged to third-party systems. These incidents may occur because developers may be writing code that simply logs the variables that are available on hand, such as logging hypertext transfer protocol (HTTP) payloads and/or other message payloads blindly, without considering the nature of the data contained within such payloads.

To address these and other issues, one or more aspects of the disclosure may, using type safety, require a developer to log safe primitives and/or explicitly assert the safety of a message being logged. For example, a logging library may be provided that includes type-safe logging methods that require any properties passed in to be instances of a safe-logging interface or to be known-safe primitive types, such as int or bool types. In addition, for a developer to log a string, the developer might need to construct a container object for the string, where the container object implements the safe-logging interface (e.g., "new KnownSafe(mystring)"). These assertions may provide a convenient red flag for code reviews to identify and evaluate, for instance, when checking for logging correctness and safety in program source code. In addition, helper methods may be provided that allow for simple concatenation and other string operations on multiple "safe" strings without losing the "safe" designation. In addition, and as a result of using object types to provide secure logging, the type-safe compiler might not compile code that potentially logs security-sensitive information (e.g., because objects passed to the type-safe logging methods must be of one or more predetermined safe types).

Figure 1A:
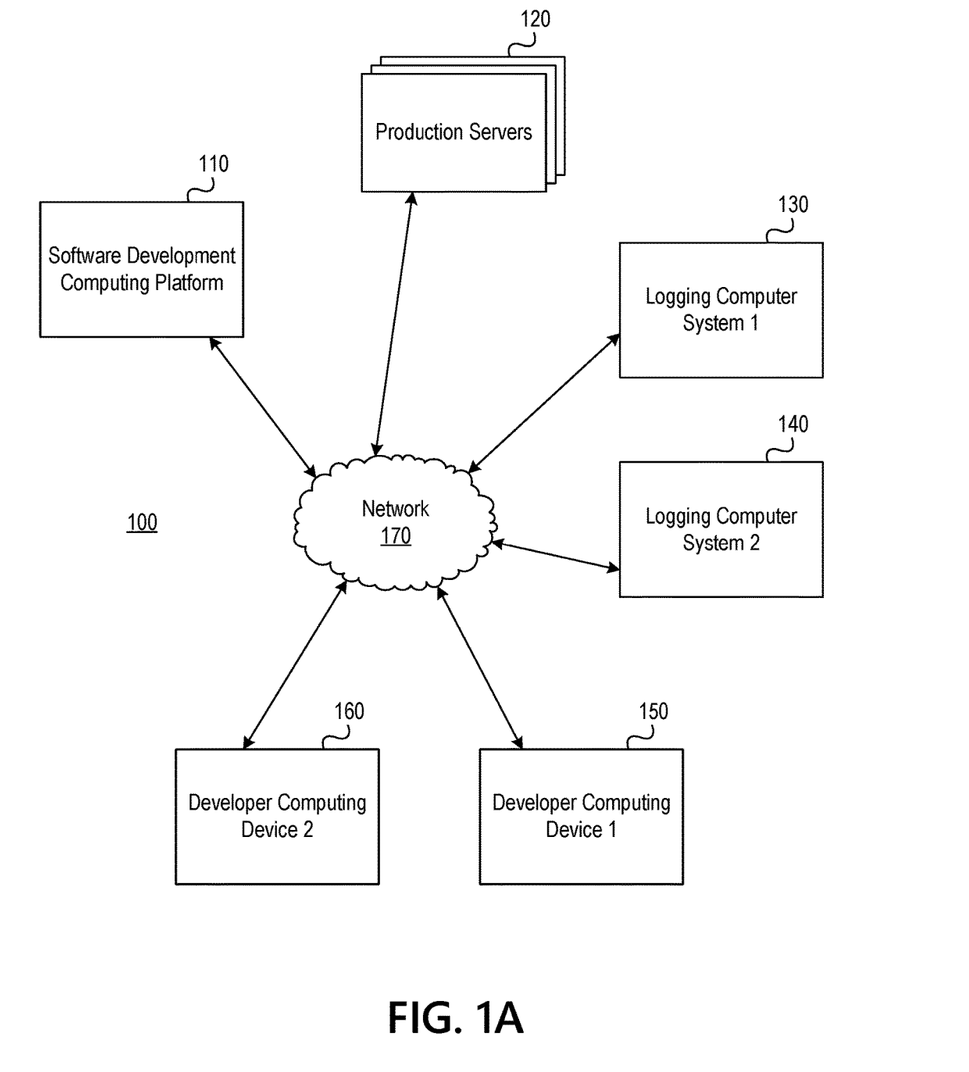
FIGS. 1A and 1B depict an illustrative computing environment for providing type safe secure logging in accordance with one or more example embodiments.
Figure 1B:
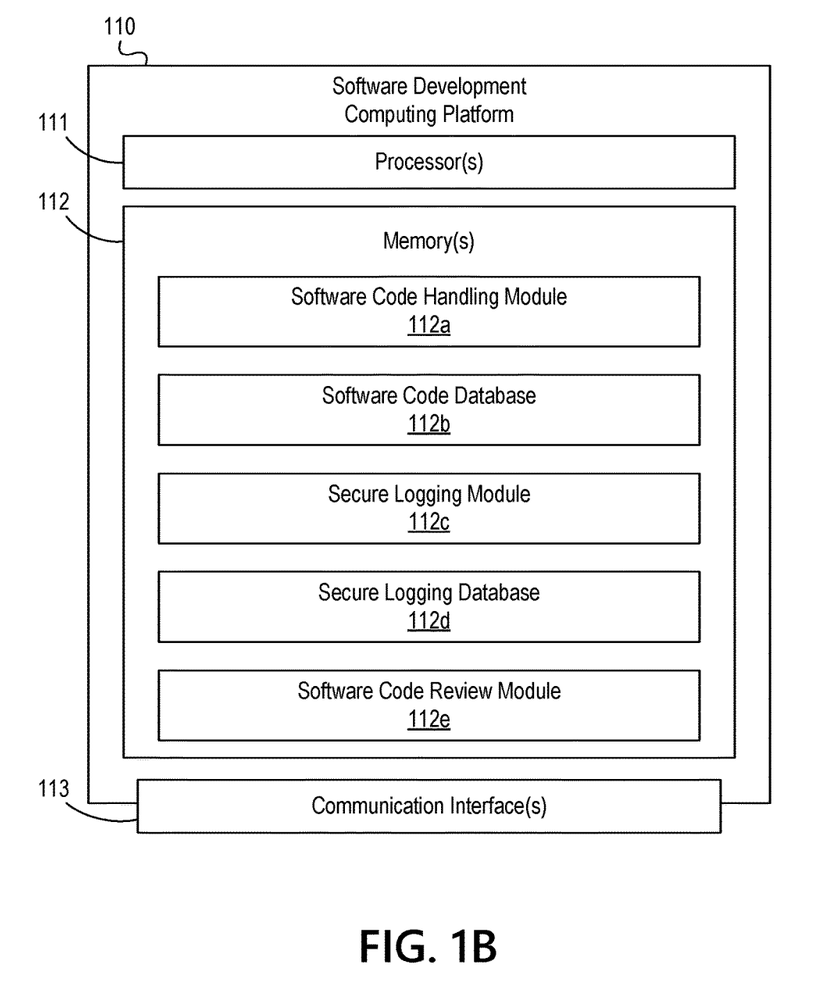

FIGS. 1A and 1B depict an illustrative computing environment for providing type safe secure logging in accordance with one or more example embodiments. Referring to FIG. 1A, computing environment 100 may include one or more computing devices and various other computing infrastructure. For example, computing environment 100 may include a software development computing platform 110, one or more production servers 120, a first logging computer system 130, a second logging computer system 140, a first developer computing device 150, and a second developer computing device 160.

As discussed in greater detail below, software development computing platform 110 may include one or more computing devices configured to perform one or more functions described herein. Production servers 120 may include one or more server computing devices configured to host and/or otherwise provide various applications, including one or more enterprise applications and/or one or more web applications, to various users, including one or more enterprise users.

Logging computer system 130 may include one or more computing devices, such as one or more server computing devices, configured to receive and/or store data for logging from one or more other systems and/or devices included in computing environment 100. Logging computer system 140 similarly may include one or more computing devices, such as one or more server computing devices, configured to receive and/or store data for logging from one or more other systems and/or devices included in computing environment 100. In some instances, logging computer system 130 may be configured to log first data associated with a first set of applications, and logging computer system 140 may be configured to log second data associated with a second set of applications different from the first set of applications.

Developer computing device 150 may be a computing device, such as a desktop computing device or mobile computing device, configured to be used by a first software application developer. Developer computing device 160 similarly may be a computing device, such as a desktop computing device or mobile computing device, configured to be used by a second software application developer different from the first software application developer. For instance, the user of developer computing device 160 may be a manager or supervisor of the user of developer computing device 150 who may review software application code written by the user of developer computing device 150.

Computing environment 100 also may include one or more networks, which may interconnect one or more of software development computing platform 110, production servers 120, logging computer system 130, logging computer system 140, developer computing device 150, and developer computing device 160. For example, computing environment 100 may include network 170, which may include one or more public networks, one or more private networks, and/or one or more sub-networks (e.g., local area networks (LANs), wide area networks (WANs), or the like).

In one or more arrangements, software development computing platform 110, production servers 120, logging computer system 130, logging computer system 140, developer computing device 150, and developer computing device 160 may include one or more processors, memories, communication interfaces, storage devices, and/or other components. In addition, and as illustrated in greater detail below, any and/or all of the computing devices included in computing environment 100 may, in some instances, be special-purpose computing devices configured to perform specific functions.

Referring to FIG. 1B, software development computing platform 110 may include one or more processors 111, one or more memories 112, and one or more communication interfaces 113. A data bus may interconnect the one or more processors 111, the one or more memories 112, and the one or more communication interfaces 113. Communication interface 113 may be a network interface configured to support communication between software development computing platform 110 and one or more networks (e.g., network 170 or the like). Memory 112 may include one or more program modules having instructions that when executed by processor 111 cause software development computing platform 110 to perform one or more functions described herein and/or one or more databases and/or other libraries that may store and/or otherwise maintain information which may be used by such program modules and/or processor 111.

In some instances, the one or more program modules and/or databases may be stored by and/or maintained in different memory units of software development computing platform 110 and/or by different computing devices that may form and/or otherwise make up software development computing platform 110. For example, memory 112 may have, store, and/or include a software code handling module 112a, a software code database 112b, a secure logging module 112c, a secure logging database 112d, and a software code review module 112e. Software code handling module 112a may include executable instructions that enable and/or cause software development computing platform 110 to receive software application code from various other computing devices, store software application code, compile software application code, and/or perform other functions. Software code database 112b may store and/or maintain software application code and/or other information that may be used by software development computing platform 110. Secure logging module 112c may include executable instructions that enable and/or cause software development computing platform 110 to enforce one or more type-safe secure logging rules when compiling software application code and/or enable and/or cause software development computing platform 110 to perform other functions. Secure logging database 112d may store and/or maintain one or more type-safe secure logging libraries and/or other information that may be used by software development computing platform 110. Software code review module 112e may include executable instructions that enable and/or cause software development computing platform 110 to provide one or more code review functions, such as notifying developers about code available for review and/or receiving code review results information, and/or enable and/or cause software development computing platform 110 to perform other functions.

Figure 2A:
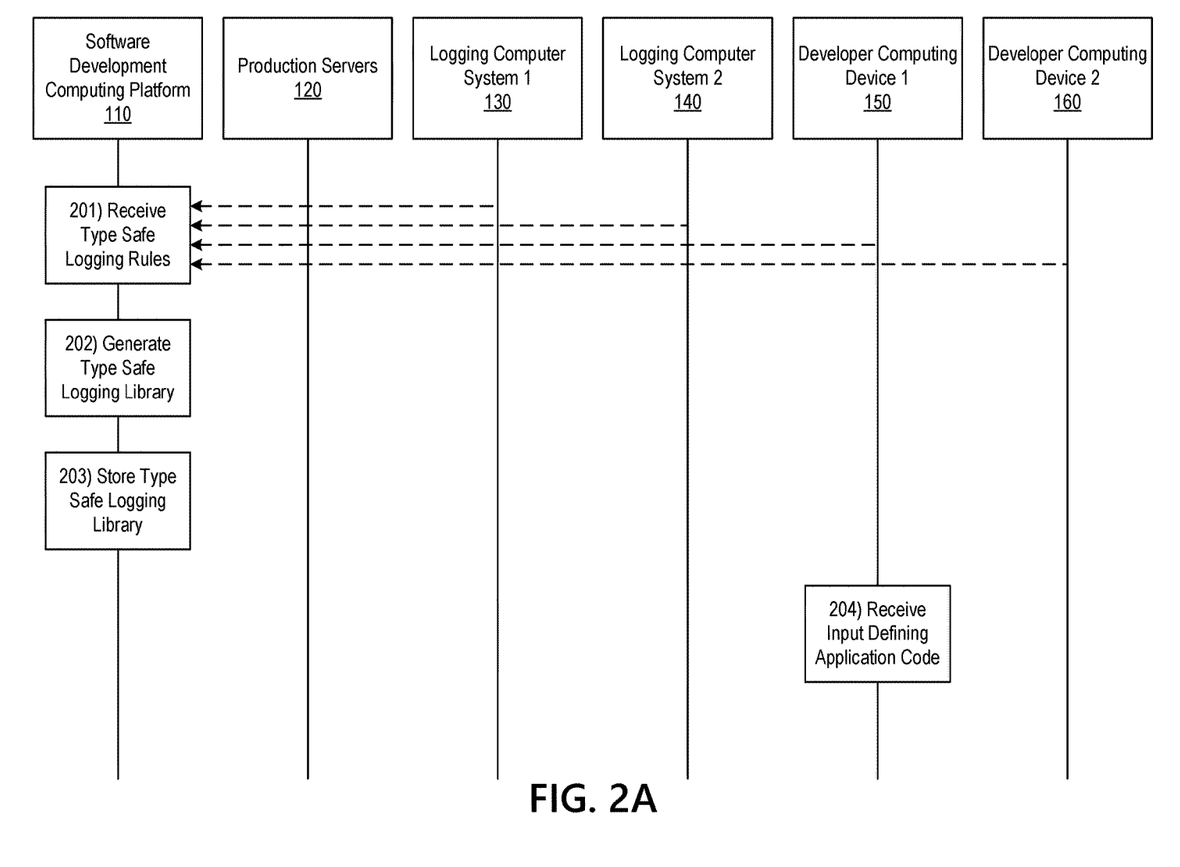
FIGS. 2A, 2B, 2C, and 2D depict an illustrative event sequence for providing type safe secure logging in accordance with one or more example embodiments.

FIGS. 2A, 2B, 2C, and 2D depict an illustrative event sequence for providing type safe secure logging in accordance with one or more example embodiments. Referring to FIG. 2A, at step 201, software development computing platform 110 may receive one or more type-safe logging rules. For example, at step 201, software development computing platform 110 may receive one or more type-safe logging rules from one or more other systems and/or devices, such as logging computer system 130, logging computer system 140, developer computing device 150, and/or developer computing device 160, and/or from one or more users of such systems and/or devices. The one or more type-safe logging rules may, for instance, define one or more types of programmatic objects as being safe for logging, such as particular classes of objects that may be defined and/or used in software application programming code. Additionally or alternatively, the one or more type-safe logging rules may, for instance, provide for and/or define one or more programmatic interfaces and/or methods for asserting and/or declaring that a particular object is safe for logging, as discussed in greater detail below.

At step 202, software development computing platform 110 may generate a type-safe secure logging library. For example, at step 202, software development computing platform 110 may generate a type-safe secure logging library based on the one or more type-safe logging rules. In generating the type-safe secure logging library, software development computing platform 110 may create and/or store one or more dynamic library files and/or other programmatic resources that define one or more programmatic classes as being safe for logging and/or that further define one or more programmatic interfaces for asserting that particular instances of classes and/or particular objects are safe for logging. Additionally or alternatively, in generating the type-safe secure logging library, software development computing platform 110 may create and/or store one or more dynamic library files and/or other programmatic resources that define one or more logging methods which only accept safe classes and/or safe objects to be logged with one or more logging systems.

In some embodiments, generating the type-safe secure logging library based on the one or more type-safe logging rules may include defining one or more classes of objects as being safe for logging. For example, in generating the type-safe secure logging library based on the one or more type-safe logging rules at step 202, software development computing platform 110 may define one or more classes of objects as being safe for logging, such as int, bool, float, and/or other classes of programmatic objects that cannot contain secret information, such as a password or other secret.

In some embodiments, generating the type-safe secure logging library based on the one or more type-safe logging rules may include defining one or more interfaces for asserting that one or more specific objects are safe for logging. For example, in generating the type-safe secure logging library based on the one or more type-safe logging rules at step 202, software development computing platform 110 may define one or more interfaces for asserting that one or more specific objects are safe for logging, such as one or more programmatic interfaces for wrapping string objects and/or other objects in a safe-logging wrapper to assert that the wrapped objects do not include secret information and to thereby allow the wrapped objects to be passed to one or more logging systems for logging.

In some embodiments, generating the type-safe secure logging library based on the one or more type-safe logging rules may include defining one or more logging methods that only accept one or more safe types of objects for logging data with one or more logging systems. For example, in generating the type-safe secure logging library based on the one or more type-safe logging rules at step 202, software development computing platform 110 may define one or more logging methods that only accept one or more safe types of objects for logging data with one or more logging systems (e.g., logging computer system 130, logging computer system 140). For instance, software development computing platform 110 may define one or more logging methods that only accept objects of int, bool, float, and/or other predetermined safe classes (which may, e.g., not include secret information due to the nature of such classes of objects) and objects that are wrapped by and/or inherit from a safe-logging interface (which may, e.g., not include secret information because the developer has coded the application in a particular way and asserted that the wrapped objects would not include secret information).

In some embodiments, the one or more logging methods defined in the type-safe secure logging library may cause a compiled software application to log data with at least one specific logging system when the compiled software application is executed. For example, the one or more logging methods defined in the type-safe secure logging library (which may, e.g., be generated by software development computing platform 110 at step 202) may cause a compiled software application to log data with at least one specific logging system (e.g., logging computer system 130, logging computer system 140) when the compiled software application is executed.

At step 203, software development computing platform 110 may store the type-safe secure logging library generated at step 202 in a database (e.g., secure logging database 112d). For example, at step 203, software development computing platform 110 may store the type-safe secure logging library.

Figure 2B:
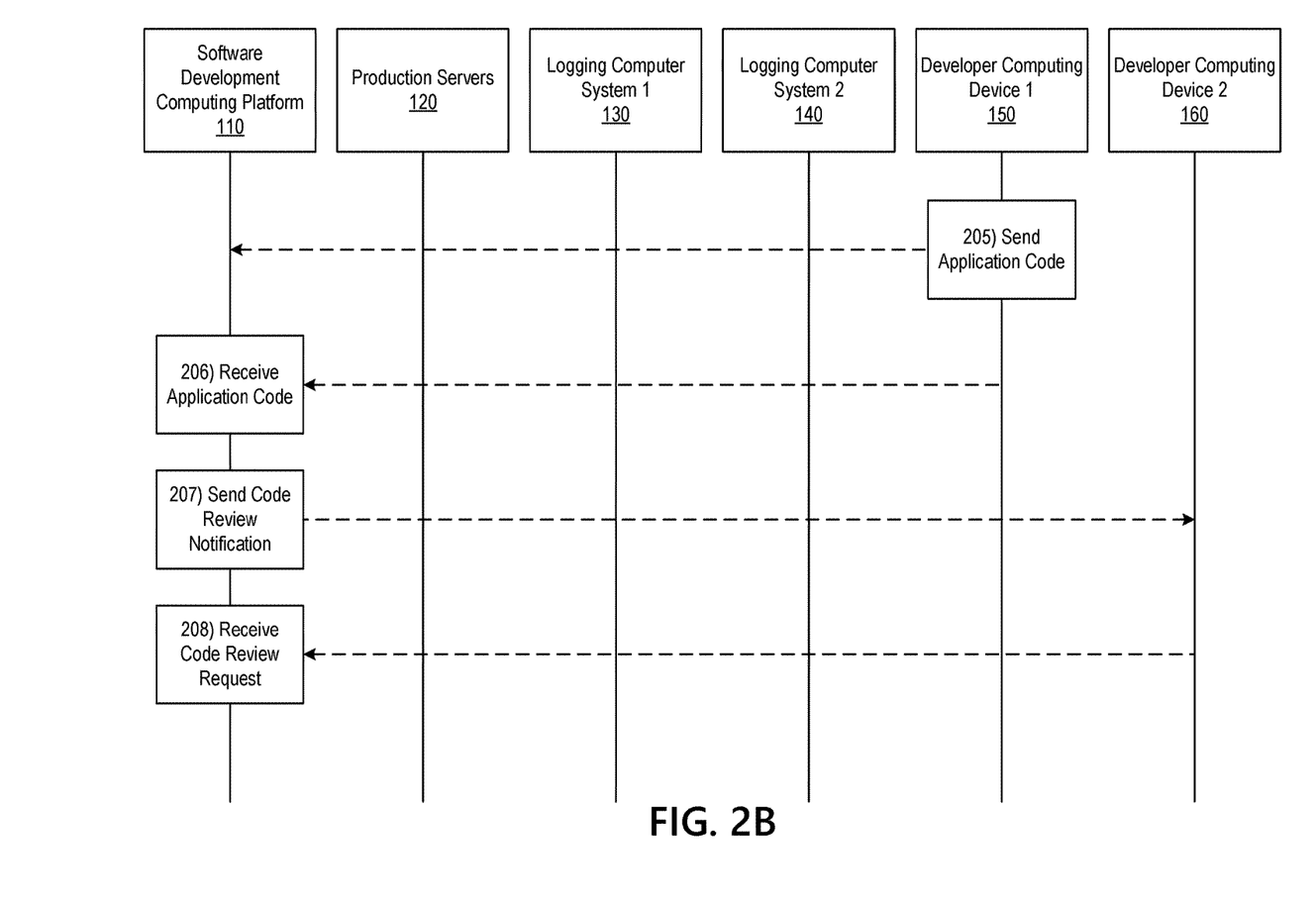

At step 204, developer computing device 150 may receive developer input defining application code. For instance, at step 204, developer computing device 150 may receive input defining software application code from a user of developer computing device 150, and the software application code may include one or more calls to one or more logging methods. Referring to FIG. 2B, at step 205, developer computing device 150 may send the application code to software development computing platform 110 (e.g., for validation, compilation, and/or storage).

At step 206, software development computing platform 110 may receive the application from developer computing device 150. For example, at step 206, software development computing platform 110 may receive application code comprising one or more calls to one or more logging methods. In some embodiments, receiving the application code comprising the one or more calls to the one or more logging methods may include receiving, via the communication interface, the application code comprising the one or more calls to the one or more logging methods from a first developer computing device. For example, in receiving the application code comprising the one or more calls to the one or more logging methods at step 206, software development computing platform 110 may receive, via the communication interface (e.g., communication interface 113), the application code comprising the one or more calls to the one or more logging methods from a first developer computing device (e.g., developer computing device 150).

At step 207, software development computing platform 110 may send a code review notification to developer computing device 160. For example, at step 207, prior to compiling the application code comprising the one or more calls to the one or more logging methods, software development computing platform 110 may send, via the communication interface (e.g., communication interface 113), to a second developer computing device (e.g., developer computing device 160), a code review notification. The code review notification may, for instance, prompt a user of developer computing device 160 to review the application code and/or prompt the user of developer computing device 160 to provide input indicating whether the application complies with one or more logging policies.

At step 208, software development computing platform 110 may receive a code review request from developer computing device 160 (e.g., requesting to review the application code in response to the notification sent at step 207). For example, at step 208, after sending the code review notification to the second developer computing device (e.g., developer computing device 160), software development computing platform 110 may receive, via the communication interface (e.g., communication interface 113), from the second developer computing device (e.g., developer computing device 160), a code review request.

Figure 2C:
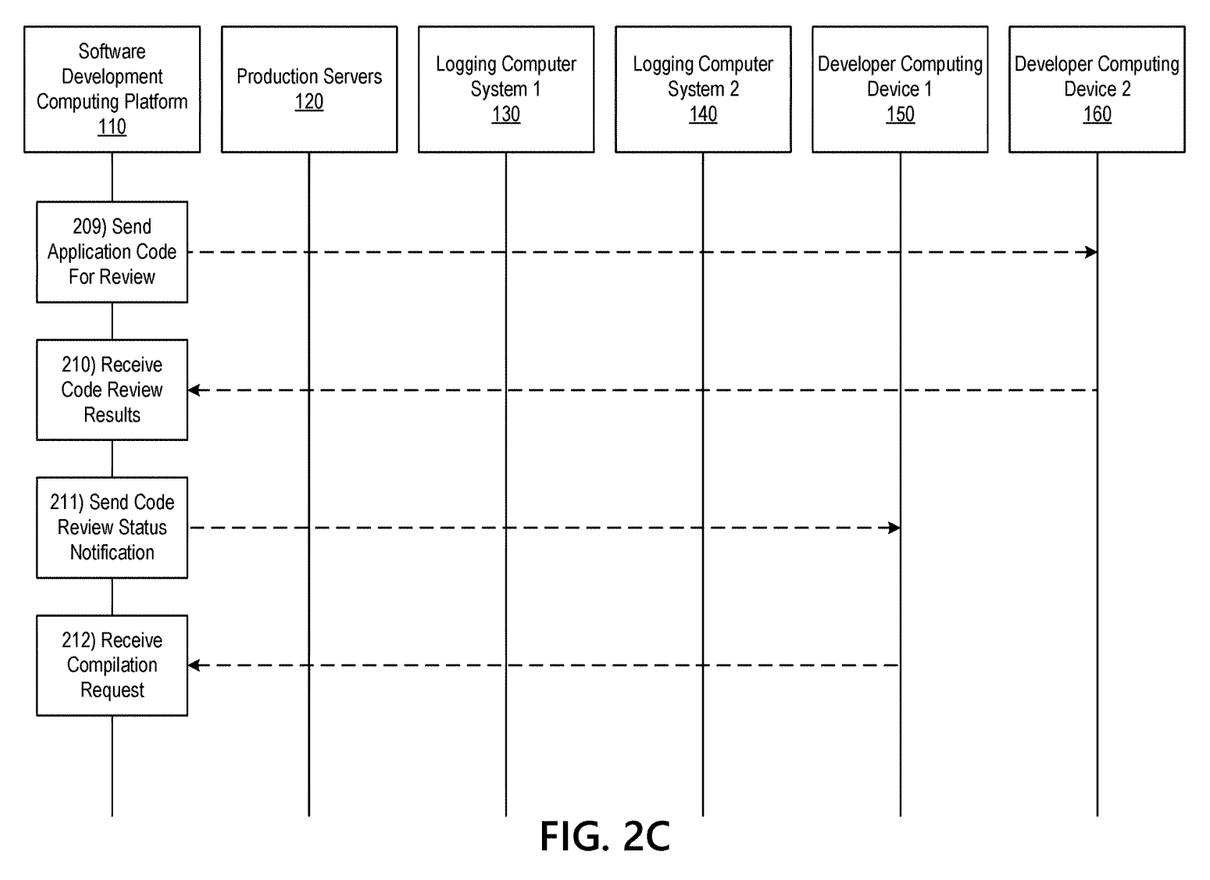

Referring to FIG. 2C, at step 209, software development computing platform 110 may send the application code to developer computing device 160 for review. For example, at step 209, responsive to receiving the code review request, software development computing platform 110 may send, via the communication interface (e.g., communication interface 113), to the second developer computing device (e.g., developer computing device 160), the application code comprising the one or more calls to the one or more logging methods. In some instances in sending the application code comprising the one or more calls to the one or more logging methods to developer computing device 160, software development computing platform 110 may cause developer computing device 160 to display and/or otherwise present one or more graphical user interfaces. For example, software development computing platform 110 may cause developer computing device 160 to display and/or otherwise present one or more graphical user interfaces similar to graphical user interface 300, which is illustrated in FIG. 3, and/or graphical user interface 400, which is illustrated in FIG. 4.

Figure 3:
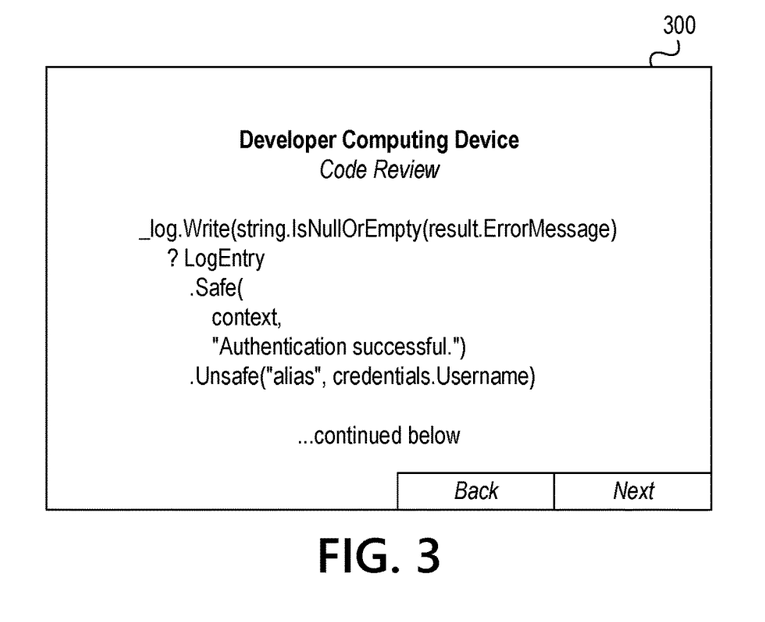
FIGS. 3 and 4 depict example graphical user interfaces for providing type safe secure logging in accordance with one or more example embodiments.
Figure 4:
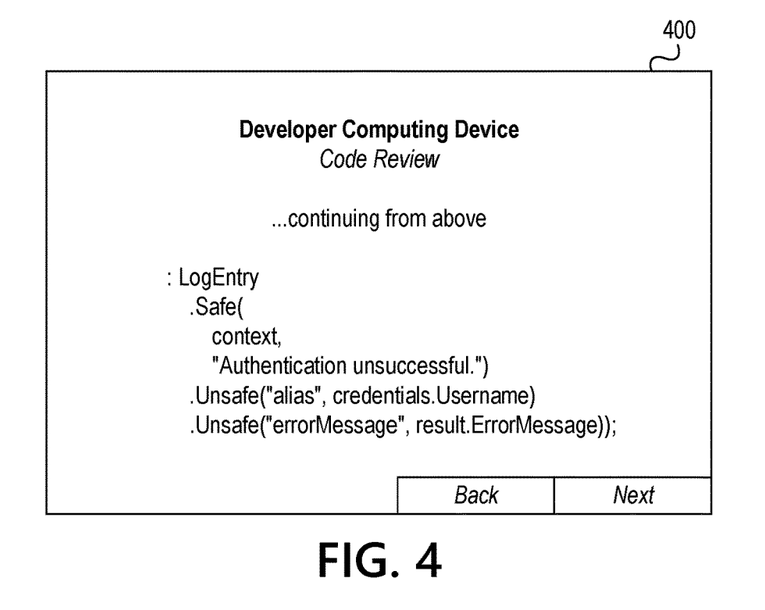

As seen in FIGS. 3 and 4, graphical user interface 300 and graphical user interface 400 may include text and/or other information associated with the application code to be reviewed, as well as one or more controls prompting and/or allowing the user of developer computing device 160 to provide input indicating whether the application code complies with one or more safe logging policies. In addition, graphical user interface 300 and graphical user interface 400, as shown in FIGS. 3 and 4, include sample application code illustrating an example of code that causes the logging of one or more safe object types. In particular, the sample application code begins in FIG. 3 and continues in FIG. 4.

In the sample application code illustrated in FIGS. 3 and 4, the .Safe( ) method will only succeed if the items passed into it are instances of the interface ISafeLog, or if the string is a compile-time constant. The .Unsafe( ) method indicates that the items contained within are string that, although the compiler cannot determine the safety of the string, the developer is attesting that the string is safe to log. During a code review, a code reviewer can find all calls to the .Unsafe( ) method and audit those. For example, it may be safe to log a username, but it might not be safe to log a password. This approach helps narrow down the focus of what a developer must review for "safety" during a code review. In the example illustrated in FIGS. 3 and 4, the developer performing the code review does not have to review "context" but does have to review that "credentials.UserName" and "result.ErrorMessage" cannot possibly contain sensitive information.

At step 210, software development computing platform 110 may receive code review results information from developer computing device 160. For example, at step 210, software development computing platform 110 may receive, via the communication interface (e.g., communication interface 113), from the second developer computing device (e.g., developer computing device 160), code review results information, such as information approving or rejecting the application code, information indicating whether the application code complies with one or more safe logging policies, information identifying one or more comments on and/or changes to the application code, and/or other information.

At step 211, software development computing platform 110 may send a code review status notification to developer computing device 150. For example, at step 211, responsive to receiving the code review results information, software development computing platform 110 may send, via the communication interface (e.g., communication interface 113), to the first developer computing device (e.g., developer computing device 150), a code review status notification. Such a notification may, for instance, include the code review results information received by software development computing platform 110 from developer computing device 160.

At step 212, software development computing platform 110 may receive a compilation request from developer computing device 150. For example, at step 212, software development computing platform 110 may receive, via the communication interface (e.g., communication interface 113), from the first developer computing device (e.g., developer computing device 150), a request to compile the application code comprising the one or more calls to the one or more logging methods.

Figure 2D:
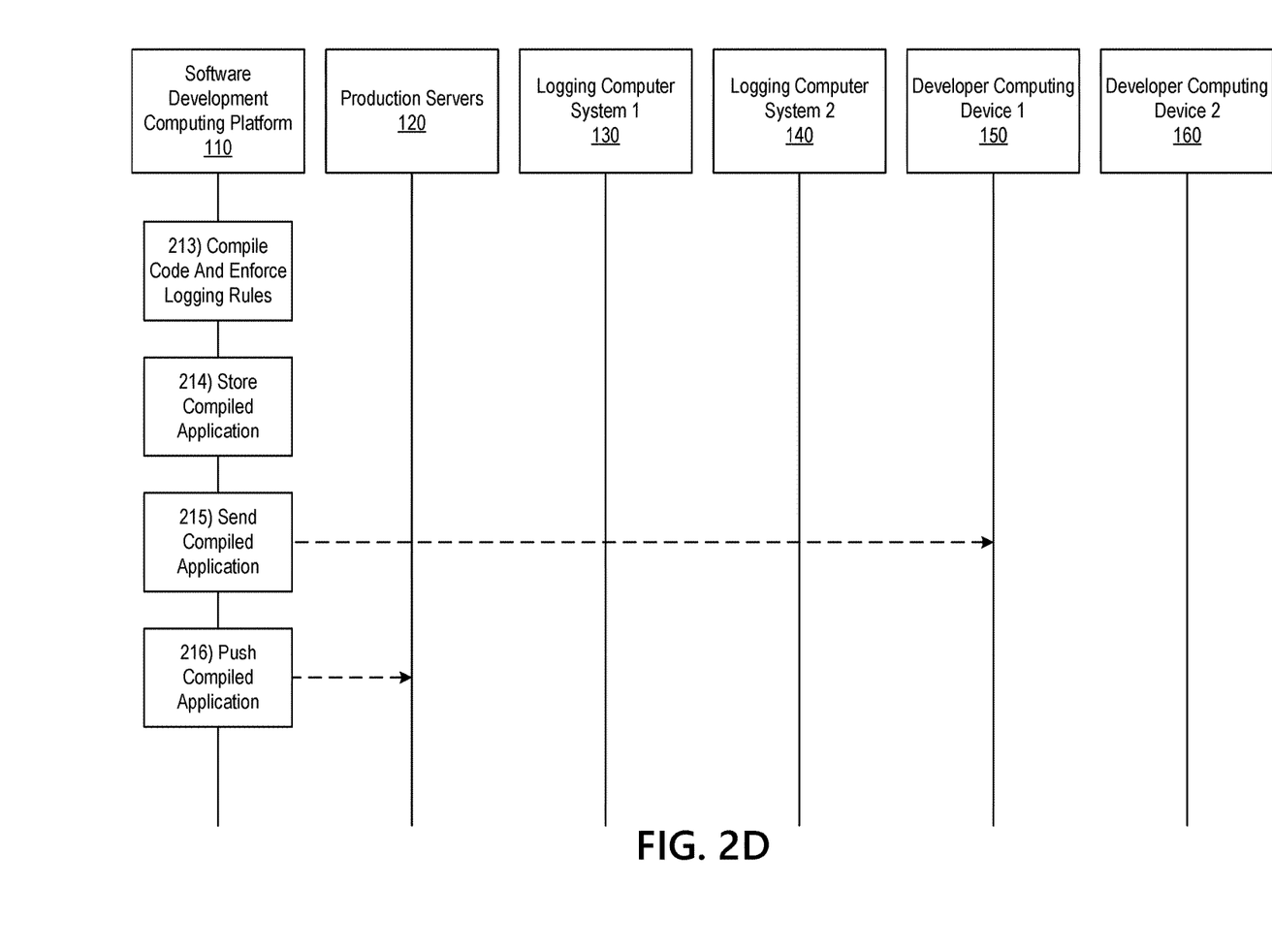

Referring to FIG. 2D, at step 213, software development computing platform 110 may compile the application code and enforce one or more type-based secure logging rules at compile time. For example, at step 213, software development computing platform 110 may compile the application code comprising the one or more calls to the one or more logging methods to produce a compiled software application. In addition, during the compiling of the application code comprising the one or more calls to the one or more logging methods, software development computing platform 110 may enforce one or more type-based secure logging rules on the application code comprising the one or more calls to the one or more logging methods.

In some embodiments, enforcing the one or more type-based secure logging rules on the application code comprising the one or more calls to the one or more logging methods may include allowing logging of one or more predetermined classes of objects. For example, in enforcing the one or more type-based secure logging rules on the application code comprising the one or more calls to the one or more logging methods at step 213, software development computing platform 110 may allow logging of one or more predetermined classes of objects, such as int objects, bool objects, float objects, and/or other predetermined classes of objects. In some instances, in allowing logging of one or more predetermined classes of objects, software development computing platform 110 may allow compilation of the application to continue without generating one or more error messages (e.g., failing to generate one or more error messages) and/or without halting compilation (e.g., failing to halt compilation).

In some embodiments, enforcing the one or more type-based secure logging rules on the application code comprising the one or more calls to the one or more logging methods may include: detecting an attempt to log at least one unsafe type of object; and in response to detecting the attempt to log the at least one unsafe type of object, generating an error message. For example, in enforcing the one or more type-based secure logging rules on the application code comprising the one or more calls to the one or more logging methods, software development computing platform 110 may detect an attempt to log at least one unsafe type of object (e.g., based on the application code including a call to a logging method that attempts to log an unsafe type of object). In addition, in response to detecting the attempt to log the at least one unsafe type of object, software development computing platform 110 may generate an error message, which software development computing platform 110 may send to developer computing device 150 and/or developer computing device 160. Additionally or alternatively, in response to detecting the attempt to log the at least one unsafe type of object, software development computing platform 110 may halt compilation and/or stop building the executable application file based on the software application code.

In some embodiments, enforcing the one or more type-based secure logging rules on the application code comprising the one or more calls to the one or more logging methods may include allowing logging of one or more potentially unsafe types of objects based on the one or more potentially unsafe types of objects being wrapped in a safe-logging wrapper. For example, in enforcing the one or more type-based secure logging rules on the application code comprising the one or more calls to the one or more logging methods, software development computing platform 110 may allow logging of one or more potentially unsafe types of objects based on the one or more potentially unsafe types of objects being wrapped in a safe-logging wrapper. For instance, software development computing platform 110 may allow logging of one or more potentially unsafe types of objects based on the one or more potentially unsafe types of objects being wrapped in a safe-logging wrapper that attests to the safety of the information being logged, such as a string object that may be considered potentially unsafe because it includes dynamic and/or runtime-generated text content. In addition the safe-logging wrapper may inherit one or more functions, such as a safe assertion function, from a safe logging interface defined in a safe logging library.

For instance, the application code may include one or more method calls that attempt to log a string that includes a server name involved in executing a particular function, and the server name thus may be considered dynamic text at runtime. To log the string that includes the server name, the application code may be written to wrap the string in a safe-logging wrapper, which may inherit attributes from a safe-logging interface or other class defined in the type safe logging library (which may, e.g., be stored by software development computing platform 110).

At step 214, software development computing platform 110 may store the compiled software application. For example, after compiling of the application code and enforcing the one or more type-based secure logging rules on the application code, software development computing platform 110 may store the compiled software application. At step 215, software development computing platform 110 may send the compiled software application to developer computing device 150. For example, at step 215, software development computing platform 110 may send, via the communication interface (e.g., communication interface 113), to a first developer computing device (e.g., developer computing device 150), the compiled software application. At step 216, software development computing platform 110 may push the compiled software application to production servers 120 for deployment. For example, at step 216, software development computing platform 110 may push, via the communication interface (e.g., communication interface 113), to one or more production servers (e.g., production servers 120), the compiled software application.

Figure 5:
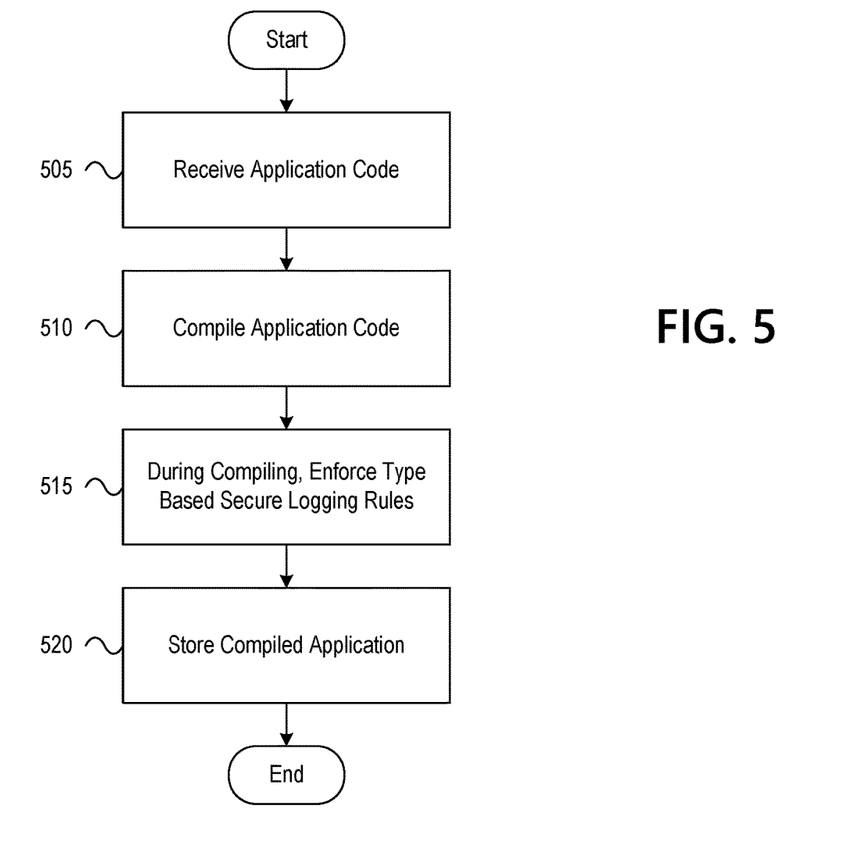
FIG. 5 depicts an illustrative method for providing type safe secure logging in accordance with one or more example embodiments.

FIG. 5 depicts an illustrative method for providing type safe secure logging in accordance with one or more example embodiments. Referring to FIG. 5, at step 505, a computing platform having at least one processor, a communication interface, and memory, may receive application code comprising one or more calls to one or more logging methods. At step 510, the computing platform may compile the application code comprising the one or more calls to the one or more logging methods to produce a compiled software application. At step 515, during the compiling of the application code comprising the one or more calls to the one or more logging methods, the computing platform may enforce one or more type-based secure logging rules on the application code comprising the one or more calls to the one or more logging methods. At step 520, the computing platform may store the compiled software application.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   at a computing platform comprising at least one processor, memory, and a communication interface:
   receiving, by the at least one processor, application code comprising one or more calls to one or more logging methods;
   compiling, by the at least one processor, the application code comprising the one or more calls to the one or more logging methods to produce a compiled software application;
   during the compiling of the application code comprising the one or more calls to the one or more logging methods, enforcing, by the at least one processor, one or more type-based secure logging rules on the application code comprising the one or more calls to the one or more logging methods; and
   storing, by the at least one processor, the compiled software application.

2. The method of claim 1, comprising:
   prior to receiving the application code comprising the one or more calls to the one or more logging methods:
   receiving, by the at least one processor, one or more type-safe logging rules;
   generating, by the at least one processor, a type-safe secure logging library based on the one or more type-safe logging rules; and
   storing, by the at least one processor, the type-safe secure logging library.

3. The method of claim 2, wherein generating the type-safe secure logging library based on the one or more type-safe logging rules comprises defining one or more classes of objects as being safe for logging.

4. The method of claim 2, wherein generating the type-safe secure logging library based on the one or more type-safe logging rules comprises defining one or more interfaces for asserting that one or more specific objects are safe for logging.

5. A computing platform, comprising:
at least one processor;
a communication interface communicatively coupled to the at least one processor; and
memory storing computer-readable instructions that, when executed by the at least one processor, cause the computing platform to:
receive application code comprising one or more calls to one or more logging methods;
compile the application code comprising the one or more calls to the one or more logging methods to produce a compiled software application;
during the compiling of the application code comprising the one or more calls to the one or more logging methods, enforce one or more type-based secure logging rules on the application code comprising the one or more calls to the one or more logging methods; and
store the compiled software application.

6. The computing platform of claim 5, wherein the memory stores additional computer-readable instructions that, when executed by the at least one processor, cause the computing platform to:
prior to receiving the application code comprising the one or more calls to the one or more logging methods:
receive one or more type-safe logging rules;
generate a type-safe secure logging library based on the one or more type-safe logging rules; and
store the type-safe secure logging library.

7. The computing platform of claim 6, wherein generating the type-safe secure logging library based on the one or more type-safe logging rules comprises defining one or more classes of objects as being safe for logging.

8. The computing platform of claim 6, wherein generating the type-safe secure logging library based on the one or more type-safe logging rules comprises defining one or more interfaces for asserting that one or more specific objects are safe for logging.

9. The computing platform of claim 6, wherein generating the type-safe secure logging library based on the one or more type-safe logging rules comprises defining one or more logging methods that only accept one or more safe types of objects for logging data with one or more logging systems.

10. The computing platform of claim 9, wherein the one or more logging methods defined in the type-safe secure logging library cause the compiled software application to log data with at least one specific logging system when the compiled software application is executed.

11. The computing platform of claim 5, wherein receiving the application code comprising the one or more calls to the one or more logging methods comprises receiving, via the communication interface, the application code comprising the one or more calls to the one or more logging methods from a first developer computing device.

12. The computing platform of claim 11, wherein the memory stores additional computer-readable instructions that, when executed by the at least one processor, cause the computing platform to:
prior to compiling of the application code comprising the one or more calls to the one or more logging methods, send, via the communication interface, to a second developer computing device, a code review notification.

13. The computing platform of claim 12, wherein the memory stores additional computer-readable instructions that, when executed by the at least one processor, cause the computing platform to:
after sending the code review notification to the second developer computing device:
receive, via the communication interface, from the second developer computing device, a code review request;
responsive to receiving the code review request, send, via the communication interface, to the second developer computing device, the application code comprising the one or more calls to the one or more logging methods;
receive, via the communication interface, from the second developer computing device, code review results information; and
responsive to receiving the code review results information, send, via the communication interface, to the first developer computing device, a code review status notification.

14. The computing platform of claim 13, wherein the memory stores additional computer-readable instructions that, when executed by the at least one processor, cause the computing platform to:
prior to compiling of the application code comprising the one or more calls to the one or more logging methods, receive, via the communication interface, from the first developer computing device, a request to compile the application code comprising the one or more calls to the one or more logging methods.

15. The computing platform of claim 5, wherein enforcing the one or more type-based secure logging rules on the application code comprising the one or more calls to the one or more logging methods comprises allowing logging of one or more predetermined classes of objects.

16. The computing platform of claim 5, wherein enforcing the one or more type-based secure logging rules on the application code comprising the one or more calls to the one or more logging methods comprises:
detecting an attempt to log at least one unsafe type of object; and
in response to detecting the attempt to log the at least one unsafe type of object, generating an error message.

17. The computing platform of claim 5, wherein enforcing the one or more type-based secure logging rules on the application code comprising the one or more calls to the one or more logging methods comprises allowing logging of one or more potentially unsafe types of objects based on the one or more potentially unsafe types of objects being wrapped in a safe-logging wrapper.

18. The computing platform of claim 5, wherein the memory stores additional computer-readable instructions that, when executed by the at least one processor, cause the computing platform to:
send, via the communication interface, to a first developer computing device, the compiled software application.

19. The computing platform of claim 5, wherein the memory stores additional computer-readable instructions that, when executed by the at least one processor, cause the computing platform to:

push, via the communication interface, to one or more production servers, the compiled software application.

20. One or more non-transitory computer-readable media storing instructions that, when executed by a computing platform comprising at least one processor, memory, and a communication interface, cause the computing platform to:
receive application code comprising one or more calls to one or more logging methods;
compile the application code comprising the one or more calls to the one or more logging methods to produce a compiled software application;
during the compiling of the application code comprising the one or more calls to the one or more logging methods, enforce one or more type-based secure logging rules on the application code comprising the one or more calls to the one or more logging methods; and
store the compiled software application.

* * * * *